United States Patent
Blankinship et al.

(12)

(10) Patent No.: US 6,283,670 B1
(45) Date of Patent: Sep. 4, 2001

(54) SPLICE CASE HAVING A SEAM SEALED BY AT LEAST ONE CLAMPING RAIL

(75) Inventors: Jenny L. Blankinship, Georgetown; Michael L. Black, Cedar Park, both of TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/409,488

(22) Filed: Sep. 30, 1999

Related U.S. Application Data

(60) Provisional application No. 60/117,383, filed on Jan. 27, 1999.

(51) Int. Cl.$^7$ ............................................. F16B 2/12
(52) U.S. Cl. ............................ 403/313; 403/338; 174/92
(58) Field of Search ..................... 403/313, 338, 403/309, 314, 344, 409.1; 24/25; 285/421; 174/92, 93; 385/54, 55, 77; 138/165, 167

(56) References Cited

U.S. PATENT DOCUMENTS

| | | | |
|---|---|---|---|
| 1,351,366 | * 8/1920 | Bowman | 403/309 |
| 4,087,190 | 5/1978 | Haeder | 403/313 |
| 4,715,740 | 12/1987 | Pichler | 403/313 |
| 4,839,472 | * 6/1989 | Pichler | 174/92 |
| 4,861,946 | * 8/1989 | Pichler et al. | 174/92 |
| 4,865,893 | * 9/1989 | Kunze et al. | 174/92 X |
| 5,048,916 | 9/1991 | Caron | 385/71 |
| 5,266,742 | * 11/1993 | Heier et al. | 174/93 |
| 5,269,568 | * 12/1993 | Courturier | 285/421 X |
| 5,331,114 | * 7/1994 | Rudolph | 174/93 |

FOREIGN PATENT DOCUMENTS

| | | |
|---|---|---|
| 2 158 992 | 5/1973 | (DE) . |
| 3336425 A1 | 4/1985 | (DE) . |
| 0 219 071 | 10/1986 | (EP) . |
| WO 95/02267 | 1/1995 | (WO) . |
| WO 95/15602 | 6/1995 | (WO) . |

OTHER PUBLICATIONS

Search Report for PCT/US00/02089 (Jun. 21, 2000).

* cited by examiner

*Primary Examiner*—Harry C. Kim
(74) *Attorney, Agent, or Firm*—Darla P. Fonseca

(57) ABSTRACT

A closure system includes two longitudinally-extending shell members, each having flanges. Each of the flanges have inner and outer surfaces such that in a closed state the inner surfaces of each of the flanges contact one another to form at least one longitudinal seam. Several longitudinally extending ramp pairs are disposed on the outer surfaces of the flanges One ramp of each ramp pair is disposed on the outer surface of one flange and another ramp of each ramp pair is disposed on the outer surface of the other flange. The ramp pairs are inclined away from the longitudinal seam when viewed along a first direction. A clamping rail has an inner surface that includes a guide channel interlocking with the ramp pairs so that the first and second flanges compress the seam. Additional longitudinally extending ramp pairs can be disposed on the outer surfaces of the flanges, in which case a second clamping rail having an inner surface that includes a second guide channel interlocks with the additional ramp pairs. In this case, the additional ramp pairs are each inclined away from the longitudinal seam when viewed along a second direction that is opposite to the first direction.

21 Claims, 8 Drawing Sheets

SPLICE CASE HAVING A SEAM SEALED BY AT LEAST ONE CLAMPING RAIL

This application is a regular application claiming priority from U.S. provisional application number 60/117,383 filed Jan. 27, 1999.

FIELD OF THE INVENTION

The present invention generally relates generally to splice case closures of the type which have two halves that are to be sealed together, and in particular to a clamping mechanism for sealing the halves of such a closure together.

BACKGROUND OF THE INVENTION

Two or more cables, such as telecommunications cables, must often be spliced together to extend or tap into a cable. The formation of a splice involves removal of the outer jacket and other layers of the cable to expose the individual conductors or optical fibers which are then individually connected to the conductors or fibers of another cable or cables. After the splice is formed, it must be protected from water and other vapors to prevent corrosion or a short circuit. For this purpose, the splice area is often enclosed in a splice case that is formed from two trough-like shell members having end plates through which the cables pass. The effectiveness of the splice case depends significantly on the mechanism used to seal the seam formed at the interface where the two shells meet.

In one known sealing arrangement, the two shell members each include integrally formed flanges that contact one another to form a seam. The seam is sealed by a series of bolts that pass through the flanges. Closure systems of this type are shown, for example, in a 1990 product catalog published by PSI Telecommunications Incorporated, entitled "2-Type Closure System". One problem with this arrangement is that the force exerted by the bolts is not uniform across the seam. Rather, the force is at a maximum in the vicinity of the bolts and is reduced at locations between the bolts. As a result, the bolts must be closely spaced along the seam to ensure an adequate seal, thus increasing the cost of the splice case and the installation time associated with its use In other sealing arrangements, the flanges receive clamping elements that extend along the seam. The clamping elements apply pressure to the flanges across their entire length. As disclosed in U.S. Pat. Nos. 5,048,916 (Caron) and 4,715,740 (Pichler), for example, the flanges and clamps are wedge-shaped so that the clamps can be more easily slipped over the flanges. While this arrangement can provide a relatively uniform pressure distribution across the seam, the pressure distribution is very susceptible to any irregularities in the wedges arising from the moulding process. Moreover, clamping mechanisms of this type requires the clamp to travel a significant distance over the flange. During this assembly process, the sealing force often becomes so great that it cannot be completed without the use of a tool. Indeed, clamps of this type are often hammered into place when they are installed in the field. This process can damage copper wire splices and the seal integrity for the closure, and is unacceptable for fiber optics splices. Moreover, because of the significant travel distance that is required to engage the flange, the size of the work area in which the closure is assembled and disassembled will also need to be correspondingly large. This is frequently problematic in the field, since the splice case is often installed in confined spaces such as a manholes or hand holes where there is very little space beyond that occupied by the splice case itself. Accordingly, there is a need in the art for a sealing arrangement for a closure, such as a splice case, in which uniform pressure is applied across the seam, which is easily engaged and disengaged from the closure (e.g., by hand), and which requires a minimum amount of working space for the clamp to be permanently mounted to the closure.

Another problem with prior art closure systems is that the closure mechanism is not permanently attached to the closure housing. Indeed, the length of many prior art closure ramps makes permanent attachment of the closure to the housing impractical. As a result, when access to the closure is desired, the clamps, bolts, or other closure devices must be removed from the splice enclosure until the work is completed. Since splice closures are frequently installed on elevated utility lines, the removed parts are easily dropped or lost, thus adding to the time and cost of work on the splice closure and often resulting in the closure system being reassembled improperly and without all of the original parts. There is thus a need in the art for a closure system in which the sealing or clamping mechanism can be permanently attached to the closure housing.

These and other needs are met by the present invention, as hereinafter described.

SUMMARY OF THE INVENTION

In one aspect, the present invention relates to a closure, such as a splice case, and a clamping element used to seal the closure. The closure comprises two sections that are joined together along adjoining flanges. The flanges are equipped with a plurality of spaced engagement elements (e.g., as opposed to a single wedged-shape flange), and the clamping element is adapted to interlock with the engagement elements in such a way that the clamping element only needs to travel a short distance in order to be engaged or disengaged.

In one embodiment of the invention, a closure system is provided that includes first and second longitudinally-extending shell members or closure elements having first and second flanges, respectively. The first and second flanges each have an inner and outer surface such that, in a closed state, the inner surfaces contact one another to form at least one longitudinal seam. A plurality of longitudinally extending ramp pairs are disposed on the outer surfaces of the flanges. A first ramp of each ramp pair is disposed on the outer surface of the first flange and a second ramp of each ramp pair is disposed on the outer surface of the second flange. The plurality of ramp pairs are each inclined away from the longitudinal seam in generally opposite directions when viewed along a first axis. The closure is provided with a clamping rail that has an inner surface equipped with a guide channel that interlocks with the plurality of ramp pairs so that the first and second flanges compress the seam. The guide channel has a shape that at least in part is a negative replica of a longitudinal profile of the plurality of ramp pairs. The guide channel may be provided with a lip along part of its length so that, after the clamping rail is inserted onto the seam and moved in a direction parallel to the seam, the lip engages the engagement elements and prevents the clamping rail from being displaced in a direction radial to the seam.

In a related embodiment, the closure system includes a second plurality of longitudinally extending ramp pairs disposed on the outer surfaces of the flanges. A second clamping rail is also provided which has an inner surface that includes a second guide channel which interlocks with the second plurality of ramp pairs. The second guide may also be equipped with a lip which engages the ramp pairs. The second plurality of ramp pairs may each be inclined away from the longitudinal seam when viewed along a second axis that is opposite to the first direction. In some embodiments, the first and second clamping rails are equipped with a locking mechanism for locking the clamping rails together.

In yet another embodiment of the present invention, third and fourth flanges are provided which form a second longitudinally extending seam located along an edge of the shell members opposite the first longitudinal seam. A third plurality of longitudinally extending ramp pairs are disposed on the outer surfaces of the third and fourth flanges at a location defining the second seam. A third clamping rail is provided that has an inner surface that includes a third guide channel interlocking with the third plurality of ramp pairs. This embodiment may further include a fourth clamping rail that has an inner surface that includes a fourth guide channel which interlocks with a fourth plurality of ramp pairs.

In another aspect, the present invention relates to a clamping element which is particularly useful with closure systems of the type described above. The clamping mechanism is pivotally mounted to at least one of the closure elements. The mount allows the clamping mechanism to freely travel a distance in the longitudinal direction at least sufficient to engage and disengage the plurality of engagement elements. In some embodiments, the clamping mechanism is provided with a series of notches, a stepped hinge, or a similar feature that allows the clamping mechanism to be held in a fixed position away from the longitudinal seam so that it will not interfere with access to the interior of the closure when the closure is opened. Since the clamping mechanism is mounted to at least one of the closure elements, it cannot become misplaced or lost when the closure is operated on, even when the closure is attached to an elevated wire.

DETAILED DESCRIPTION

The present invention pertains to a sealing arrangement which is particularly useful for splice enclosures and other cases of the type comprising two shell members that meet along two longitudinally extending seams. However, the invention is also useful in other closure systems, such as those that employ a single sealing sleeve (e.g., a sleeve having a single seam located along a longitudinal slit in the sleeve) rather than two shell members.

Figure 1:
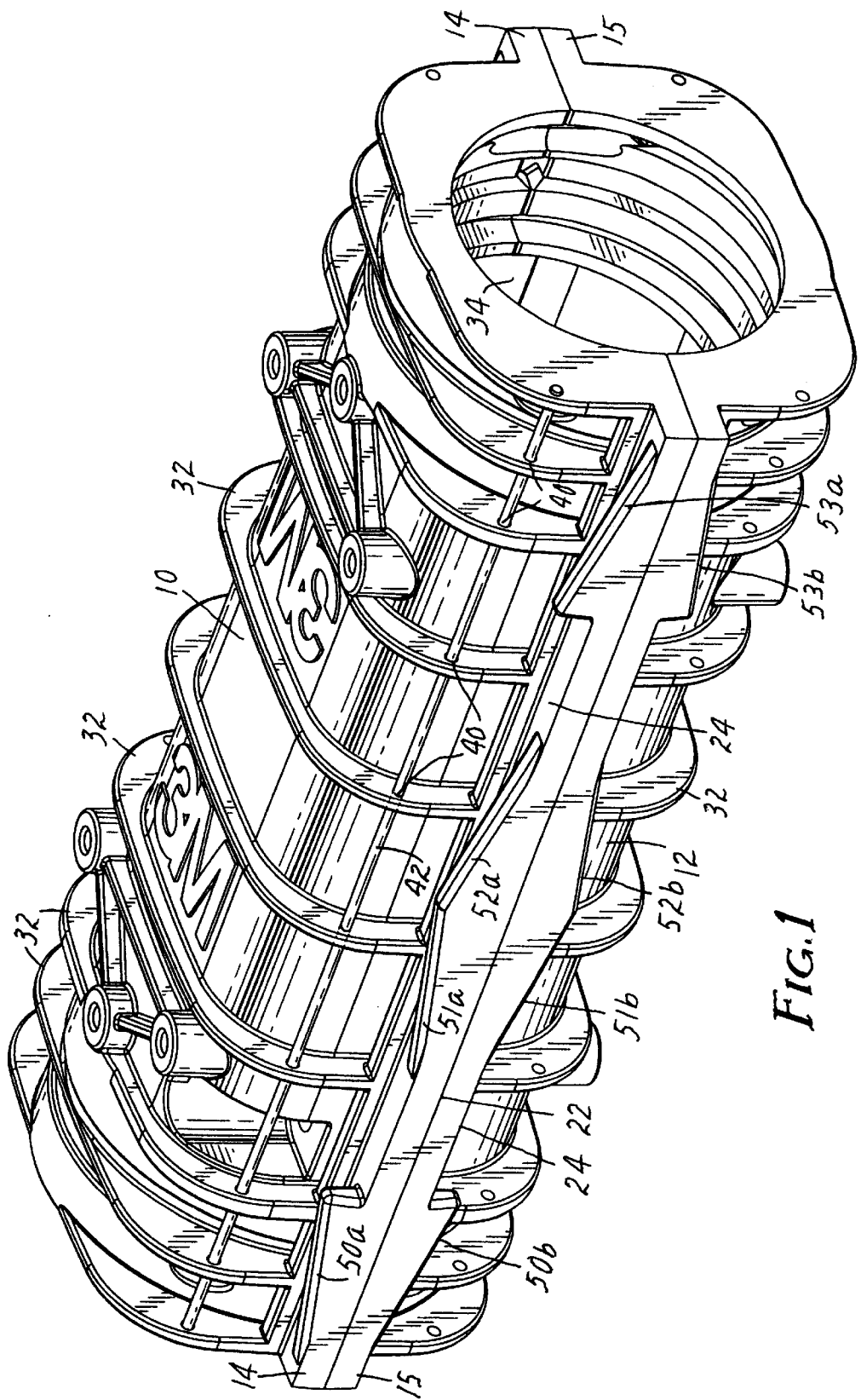
FIG. 1 is a perspective view of a splice case sealed with the clamping rail of the present invention, which splice case comprises two trough-shaped shells that meet along a seam to form a closure.

FIGS. 1–8 depict various views of one embodiment of a closure constructed in accordance with the present invention. FIG. 1 shows two shell members 10 and 12 that are joined together at flanges 14 and 15. The shell members are preferably identical so that the shell members from two or more closures can be used interchangeably. The flanges are integrally formed with the shell members, and define longitudinally extending seams 22 (only one of which is visible in FIG. 1) along their line of contact. When the shells are joined together they define opposing circular openings 34 (only one of which is visible in FIG. 1), which each receive an end seal (not shown) through which a cable may be inserted. The shell members may be semi-cylindrical in shape or, as shown in FIG. 1, they may have a cross-sectional shape that results in a generally square cross-section when they are joined together. A series of ribs 32 are formed on the outer surface of the shell members and extend circumferentially around the opposing shells. The ribs serve as strength members that provide stiffness to prevent flexure of the splice case.

The shell members may be formed from various materials and by various processes. Preferably, the shells are formed from a plastic such as polypropylene in an injection-molding process. Polypropylene is advantageous because it is sufficiently impact resistant and has a sufficiently low surface energy to withstand the various environments, such as underground burials, in which the splice case will be typically employed.

Figure 3:
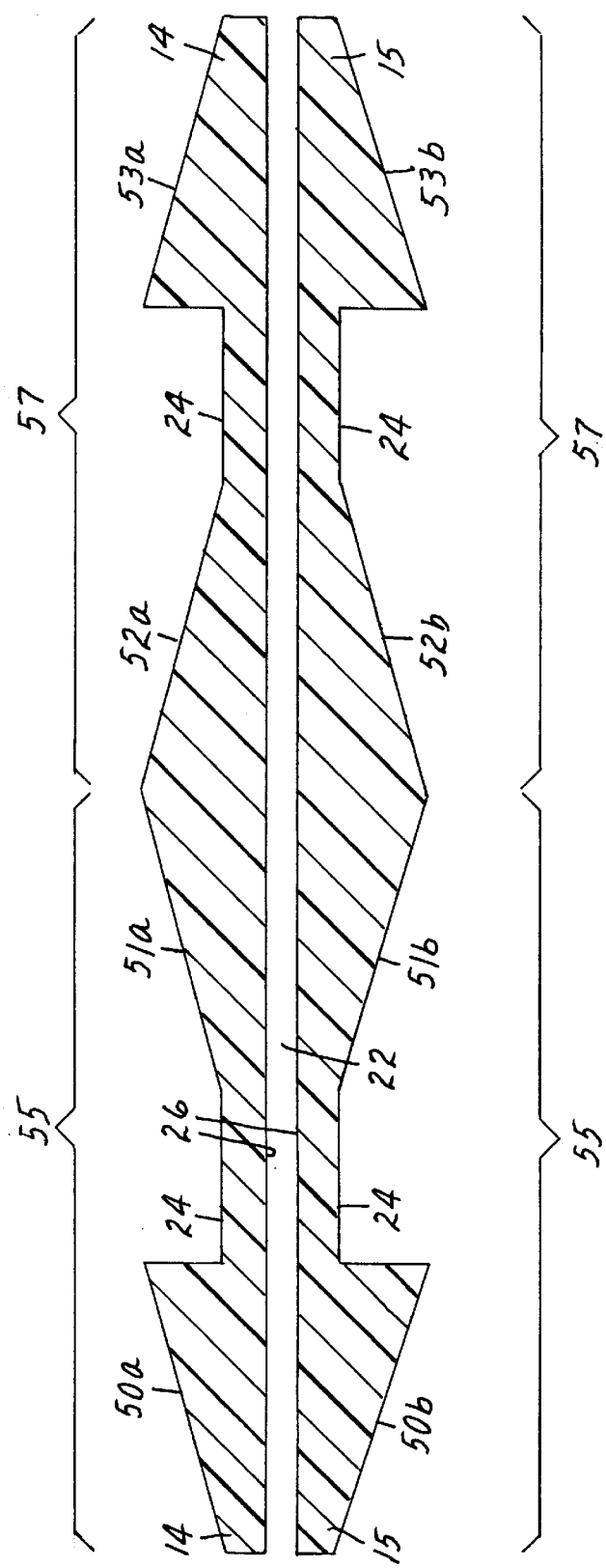
FIG. 3 is a schematic drawing of the embodiment of FIG. 1, illustrating the flanges and their respective ramps.
Figure 6:
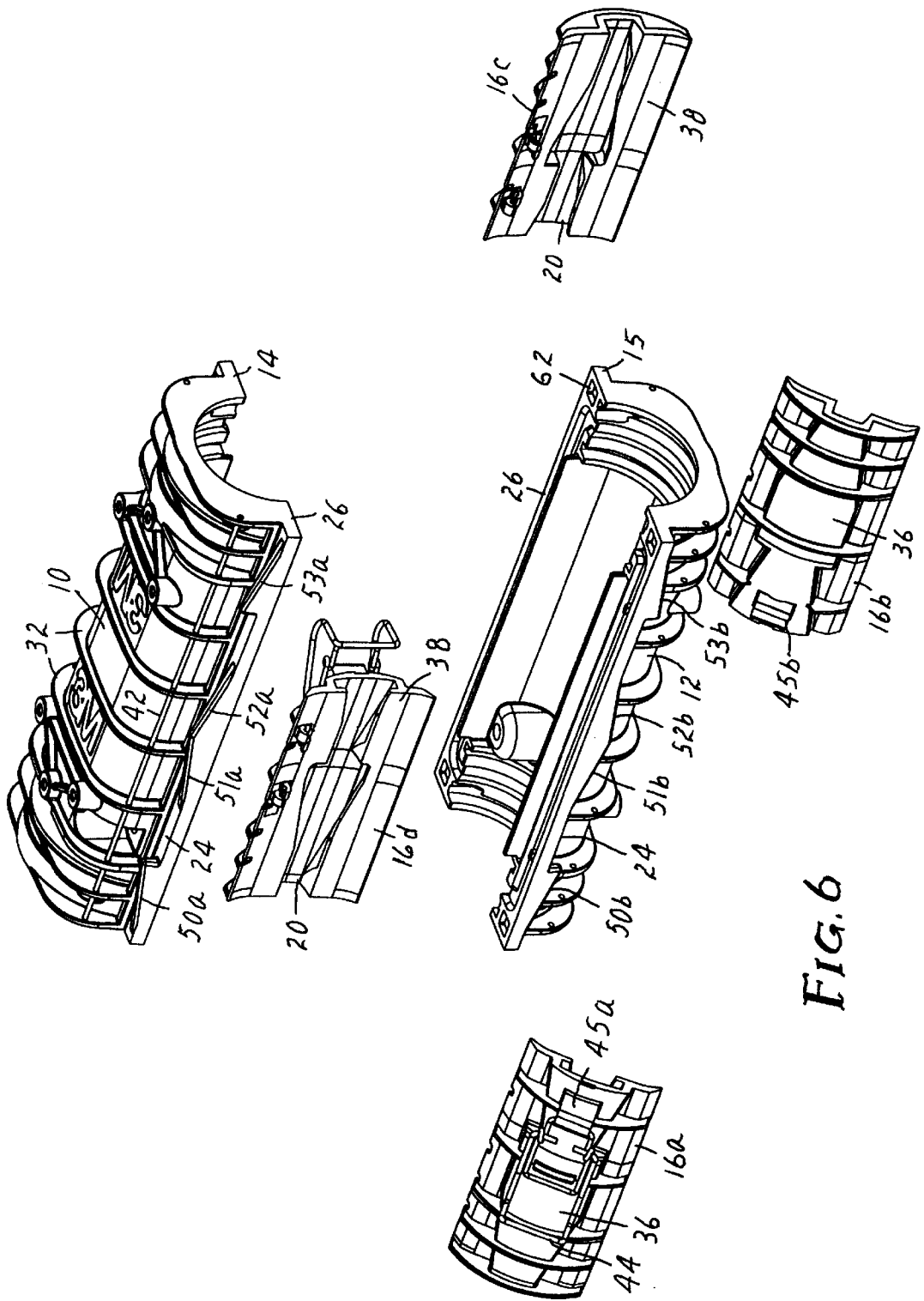
FIG. 6 is an exploded view of the splice case of FIG. 2.

As best seen in FIGS. 3 and 6, each flange includes outer and inner surfaces 24 and 26, respectively, the inner surfaces having a generally planar configuration. The inner surfaces of the flanges contact one another to form the longitudinally extending seams 22. For each of the two seams, a plurality of ramp pairs 50a, 50b, 51a, 51b, 52a, 52b, 53a, and 53b are located on the outer surface of the flanges. That is, each ramp pair includes a first ramp, e.g., ramp 50a, located on the outer surface of flange 14 and a second ramp, e.g., ramp 50b, located on the outer surface of flange 15. The first and second ramps of each ramp pair are mirror images of one another about a plane extending through a seam 22. The individual ramps extend in the longitudinal direction and incline away from the seam as viewed along the inward direction, which is defined as the direction perpendicular to the longitudinal axis and parallel to the longitudinally extending seam at the mid-point of the splice case. Preferably, the ramps extend away from the seam at an angle within the range of about 5° to about 25°, more preferably at an angle within the range of about 10° to about 25°, and most preferably at an angle within the range of about 10° to about 20°.

Figure 2:
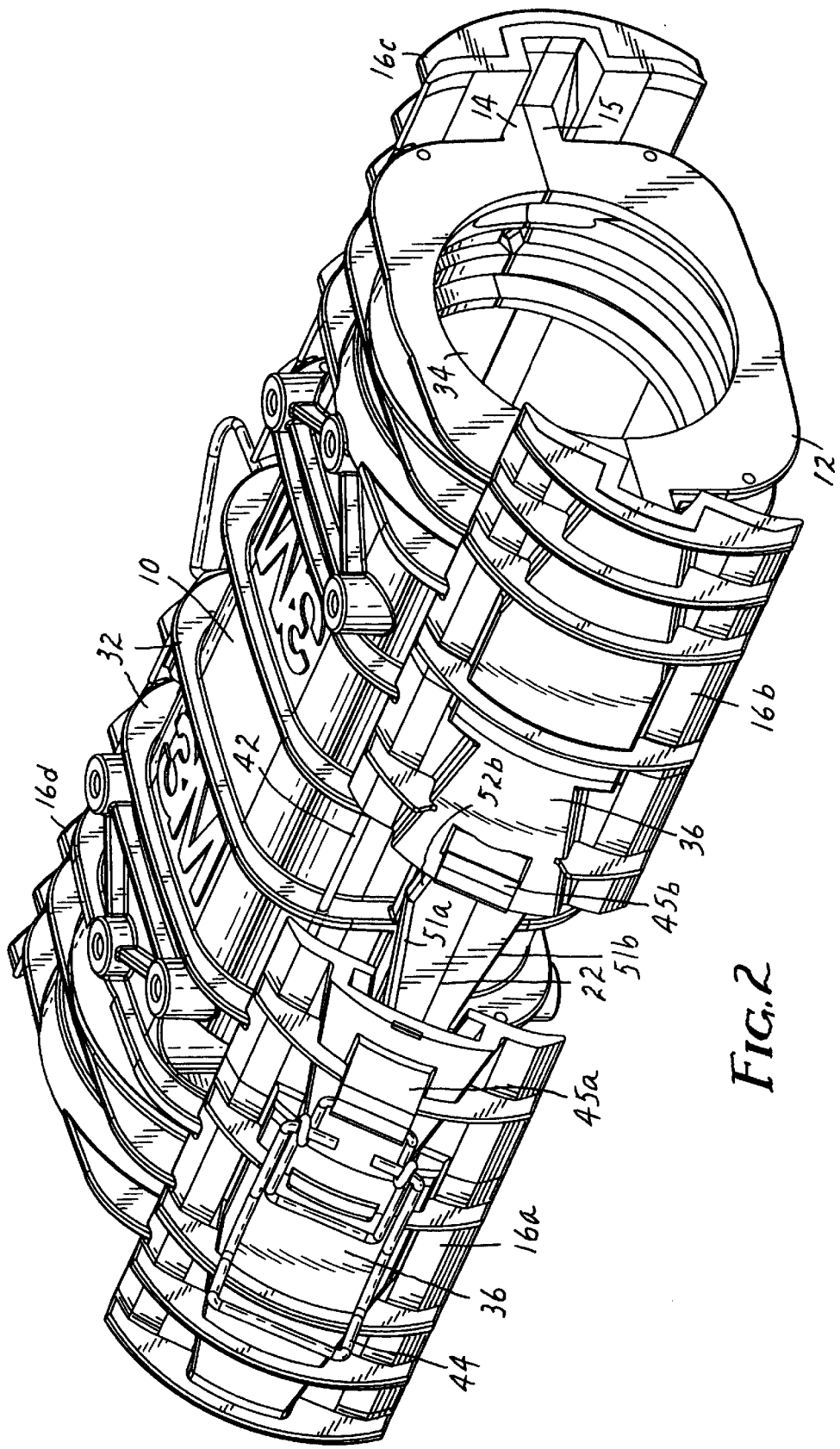
FIG. 2 is a perspective view of the splice case of FIG. 1 with the clamping rails positioned prior to their installation on the ramps.

As detailed below and illustrated in FIG. 2, a single clamping rail, which consists of clamping elements 16a and 16b, engages a set of ramp pairs. Each set of ramps includes at least two ramp pairs, with the total number of ramps being dictated in part by the length of the closure and the desired force with which the closure elements are to be engaged. In the particular embodiment of the invention shown in the figures, first and second sets (55 and 57, respectively; see FIG. 3) of ramp pairs are shown. The first set, which includes ramp pairs 50a, 50b and 51a, 51b, are used to engage a first clamping rail. The second set, which includes ramp pairs 52a, 52b and 53a, 53b, are used to engage a second clamping rail. The two sets of ramp pairs are inclined in opposite directions from one another (although the ramps in each set incline away from the longitudinally extending seam when viewed inward from the end of the splice case nearest the first and second sets of ramp pairs).

Figure 4:
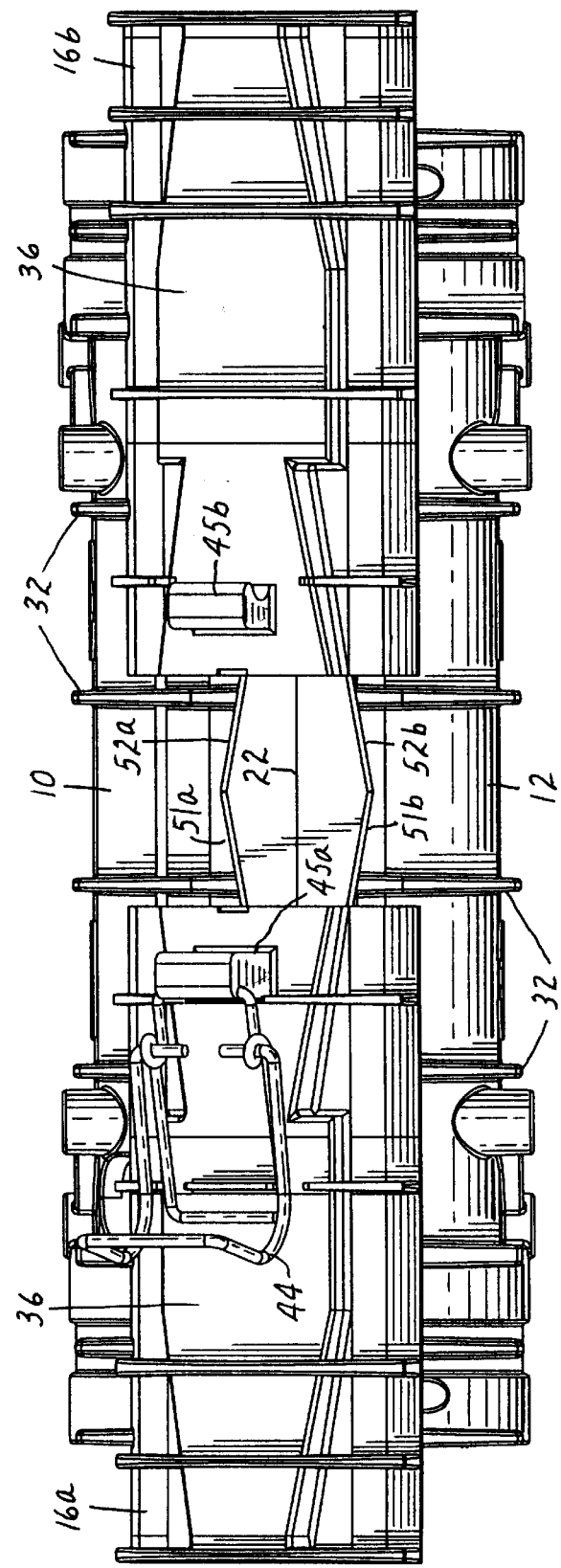
FIG. 4 is a side view of the closure of FIG. 1 with the clamping rails positioned prior to clamping the seam.

In accordance with the present invention, each individual clamping rail provided to seal the longitudinally extending seam is arranged to interlock with at least two ramp pairs. Specifically, as indicated in FIGS. 2, 4 and 6, clamping rail 16a engages ramp pairs 50a, 50b and 51a, 51b and clamping rail 16b engages ramp pairs 52a, 52b and 53a, 53b. Each clamping rail has an outer surface 36 that may have a semicylindrical or other shape. The embodiment of the invention shown in the figures employs four clamping rails 16a, 16b, 16c, and 16d. When the clamping rails are properly positioned on the shell members as in FIG. 7, the cross-section of the assembled splice case is approximately elliptical in shape. The clamping rails each have an inner surface 38 that generally conforms to the side of the splice case on which the rail is to be located. For example, in the illustrated embodiment, the inner surface of each clamping rail is concave with a radius of curvature that allows the inner surface to fit closely against the outer surface of shell members.

The clamping rails may be formed from various materials and by various processes, but are preferably formed from a creep-resistant plastic in an injection-molding process to prevent relaxation of the compressive forces exerted on the longitudinally extending seam. One example of a suitable creep resistant plastic is glass-filled polypropylene.

Figure 5:
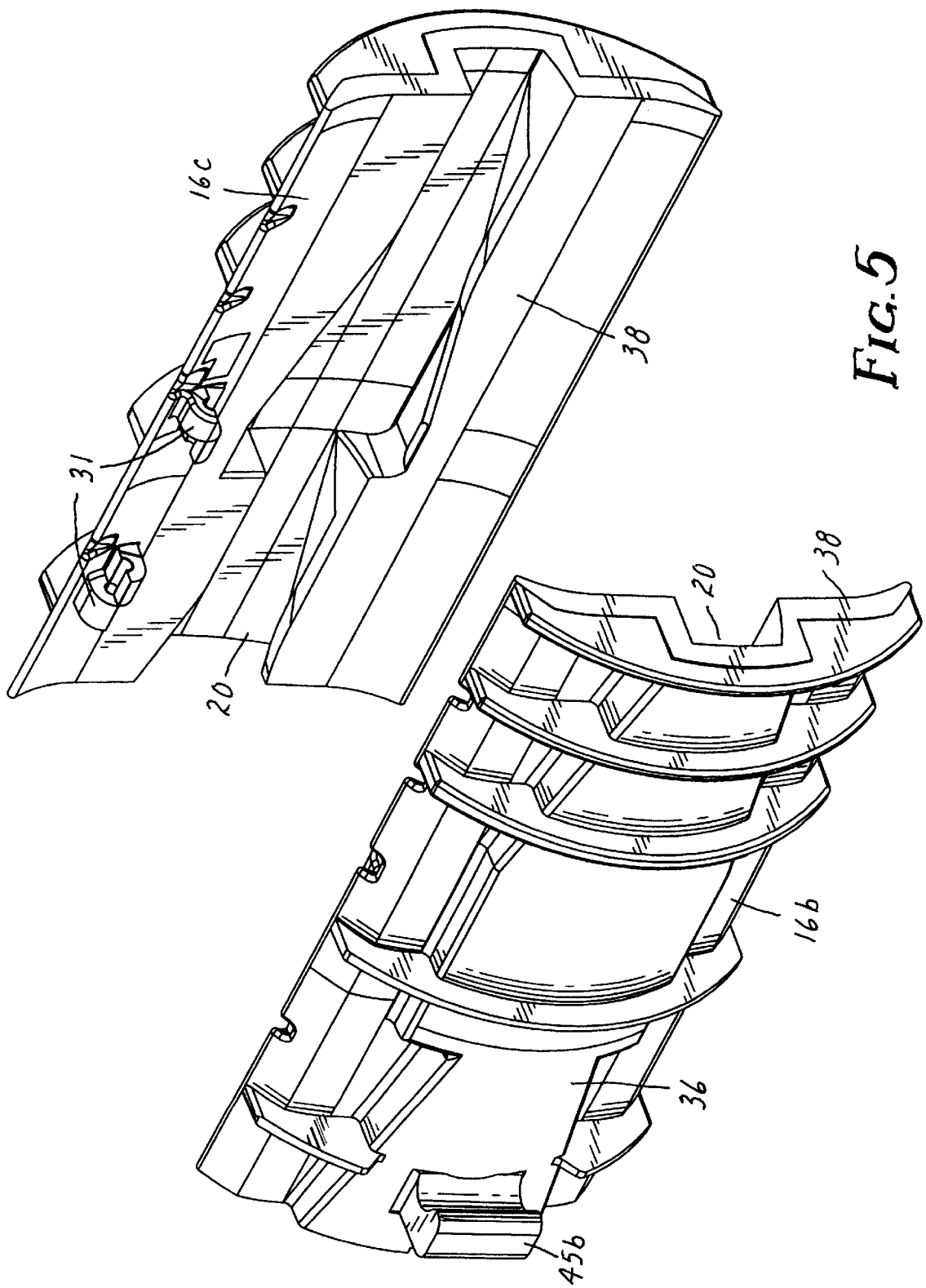
FIG. 5 is a perspective view of one of the opposing pairs of elements of the clamping rails of FIG. 2.

A guide channel 20 is located in the inner surface 38 of each clamping rail (see FIGS. 5 and 6). Each guide channel has a configuration that corresponds to the set of ramp pairs which interlocks with the guide channel. The guide channels are recessed in the inner surface of the clamping rails and form a negative replica of the profile of the set of ramp pairs with which they interlock. The guide channel may also include a portion that serves to lock the clamping rail onto the ramp pairs so that the clamping rail cannot be radially displaced from the ramps. This locking function is achieved by inserting the radially locking portion, which forms a lip on the edge of the longitudinally extending groove, between one of the ramps and the outer surface of the shell member on which the ramp is located. The radially locking portion of the guide channel is automatically inserted in its proper position when the clamping rail engages the ramp pairs in the manner explained below.

The clamping rails are mounted onto their respective ramp pairs by initially positioning a given clamping rail adjacent to, and longitudinally displaced from, the ramp pairs (see FIG. 4) and then sliding the clamping rail onto the ramps. Typically, the ramps are all of equal size and the spacing between the individual ramps on a flange are preferably about half the longitudinal dimension of the ramps. Accordingly, the clamping rail travels a distance about equal to half the length of the ramp before it reaches its final locking position. If, as in the previously mentioned known clamping arrangements, a single ramp pair is employed that extends over the length of flanges 14 and 15, the clamping rail must travel a relatively great distance to reach its final locking position. By comparison, the clamping rails of the present invention travel a much shorter distance to reach this position, since each clamping rail is engaged by at least two ramp pairs. As a result, the overall clamping procedure is less affected by defects in molding accuracy for the ramps than are prior art clamps of the type mentioned above.

Since the clamping rails of the present invention are engaged and disengaged by traveling a relatively short distance, in some embodiments of the present invention the clamping rails may be permanently mounted to one of the shell members of the splice case. This feature both facilitates installation of the clamping rails and helps prevent the clamping rails from being lost or dropped (e.g., when the closure is installed on an overhead wire) when the closure is disassembled for repairs or to be operated upon. As shown in FIG. 1, a series of holes 40, grooves or other retaining arrangements are formed in the ribs 32 of one of the shell members through which a rod 42 can be inserted. The rod is connected to the clamping rails via retaining members 31 (see FIG. 5), each of which is provided with a hole through which the rod can be extended. The retaining members are integrally formed on the inner surface of the clamping rails and are arranged along a longitudinally extending edge of the clamping rails. When the clamping rails are pivotably coupled to one of the shell members in this manner, the clamping rails are also free to travel longitudinally inward and outward by sliding along the rod to engage and disengage the ramps. In this way, the clamping rails have sufficient freedom of movement so that they can be engaged and disengaged without being physically separate from the shell members. This arrangement which would be impracticably cumbersome and mechanically weak if the clamping rail were required to travel the distance that must be traversed in prior art devices featuring only a single ramp pair. The clamping rails may also be provided with appropriately positioned notches to allow the clamping rail to pivot freely in a direction transverse to the seam.

The clamping rails may be provided with a stop or other feature which checks the longitudinal progress of the clamping rail along the seam when the clamping rail has reached its optimum locking position, which in many instances will be in the center of the closure. For example, the stops may be in the form of a protrusion which is positioned on the clamping rails such that it comes into contact with one or more of the ribs 32 on the shell members 10 and 12 when the clamping rail has reached its optimum position. In some embodiments, the retaining members 31 themselves may be used advantageously for this purpose. For purposes of disassembly, the edges of two clamping rails which come into contact with each other may be provided with a small notch so that a small pit or divot is formed when the edges are brought together. This pit or divot allows a screwdriver (preferably a flathead screwdriver) to be inserted between the clamping rails so that the clamping rails can be pried apart if needed.

Figure 7:
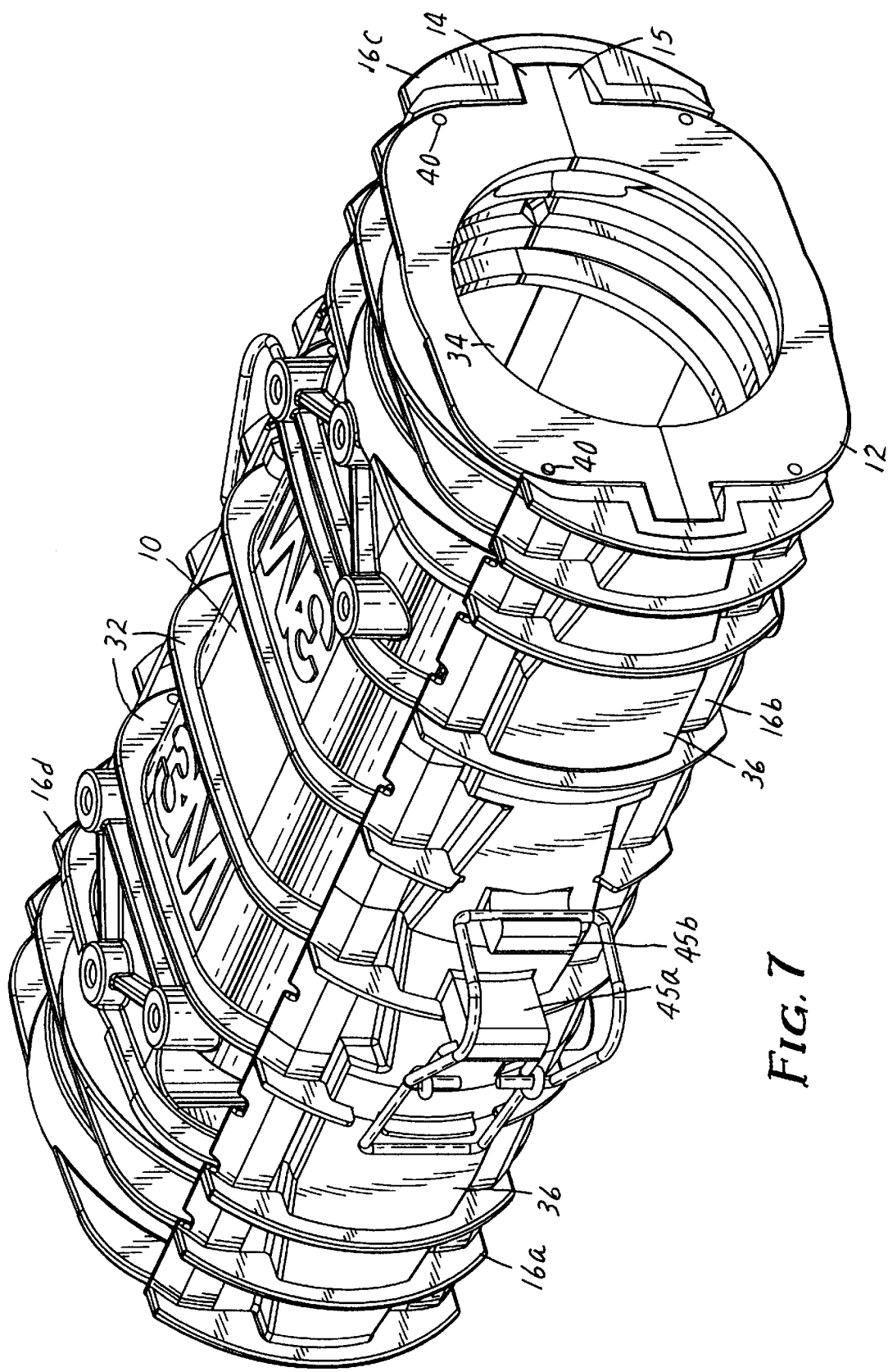
FIG. 7 is a perspective view of the splice case of FIG. 2, which illustrates the splice case in its assembled state.
Figure 8:
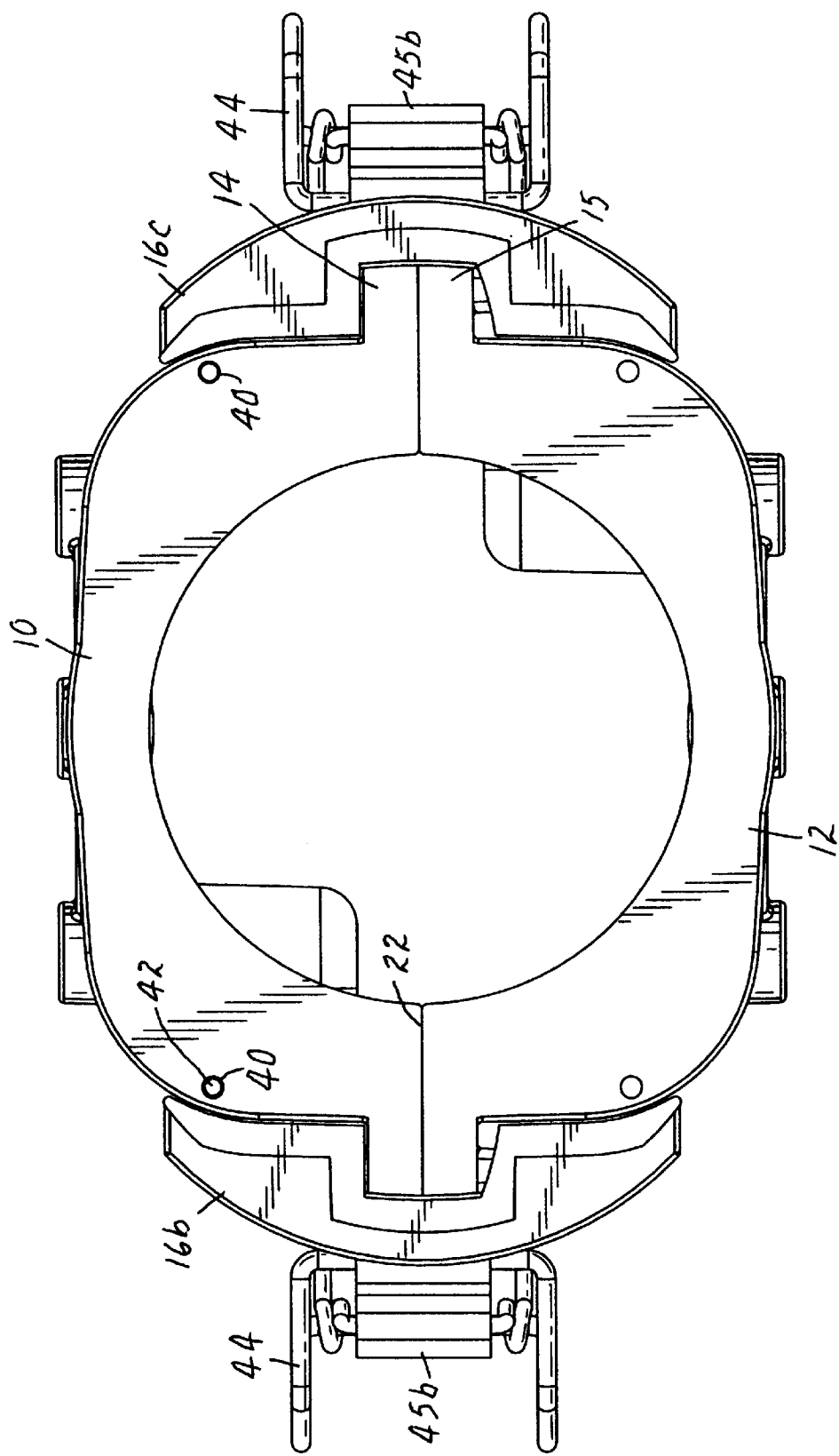
FIG. 8 shows a plan view of one end of the splice case of FIG. 2.

As best shown in FIGS. 4 and 7, a latch 44 is provided on the outer surface of the clamping rails. The individual latch element 45a of a given clamping rail interlocks with the latch element 45b of the adjacent clamping rail to stabilize the splice case and to prevent the clamping rails from inadvertently sliding off the ramps. The latch also provides a mechanism for urging the clamping rails into their final locking position (without the use of any tools) in the event that frictional forces prevent the clamping rails from otherwise assuming this position. In some embodiments, the latch may be further provided with a lock to prevent unauthorized access into the splice case. This feature is particularly desirable in situations where multiple parties will have access to the location in which the closure is installed.

In the embodiment of the invention depicted in the figures, the splice case has two longitudinally extending seams that are each clamped by two clamping rails. For example, the longitudinally extending seam visible in FIG. 2 is clamped by clamping rails 16a and 16b. Each of the clamping rails engages with two pairs of ramps. Specifically, as seen in FIG. 6, clamping rail 16a engages ramp pairs 50 and 51 while clamping rail 16b engages ramp pairs 52 and 53. However, the present invention encompasses splice cases that employ any number of clamping rails that each engage a plurality of ramps pairs. That is, each clamping rail may engage any desired number of ramp pairs equal to or greater than two ramp pairs. The particular number of ramp pairs engaged by each clamping rail may even differ from clamping rail to clamping rail. In this regard, it should be noted that, while clamping rails 16a and 16b (and their corresponding sets 55 and 57 of ramps pairs) are depicted as mirror images of one another, the present invention encompasses other arrangements as well in which clamping rails (and their corresponding sets of ramps pairs) are asymmetrically configured with respect to one another. Moreover, while the individual ramps of each ramp pair are depicted as mirror images of one another, the present invention also encompasses embodiments in which the individual ramps of each ramp pair are configured differently from one another or are asymmetric across the seam. In one embodiment of the application, for example, ramps are disposed on only one flange, with the adjoining flange being essentially flat and being equipped with a lip to engage the clamping element. Finally, as previously mentioned, the present invention is applicable to a splice case that has only a single seam, such as in a split sleeve or "clam shell" arrangement. Such single seam enclosures are particularly useful in copper cable applications.

In many applications, the closure system of the present invention will be provided with a compressible, preferably resilient gasket which is disposed between adjoining flanges before the clamping mechanism is attached. Suitable materials useful in making such a gasket are well known in the art. The flanges and/or gasket may be provided with grooves, lips, depressions, or other such features to ensure proper placement and orientation of the gasket.

The shell members 10 and 12 of the present invention may be conveniently fitted with an air valve to facilitate a 10 psi flash test or other such tests as are used in the industry to verify seal integrity. Since such tests frequently rely on visual indicators (e.g., the formation of bubbles in a soap solution which is applied to the seam), the clamping rails of the present invention may be structured with a series of open slots to facilitate viewing of the seam areas during such testing. The open slots also ensure proper drainage of rainwater when the closure system is mounted outdoors since, in such situations, the clamping rails will often be at the lowest point of the closure, and their inner surface (which will frequently be concave and may contain guide channels and other depressed areas) would otherwise tend to accumulate water.

With reference to FIG. 1, the shell members of the present invention may also be provided with a plurality of rounded apertures 60 through which screws, bolts, nails, or other suitable fasteners may be inserted. Such apertures are useful for securing the shell members to a substrate when the shell member must be held stationary, as during fiber optic splicing operations. Similarly, the shell members may be provided with a slit 62 near their outer edges (see FIG. 6) through which an adjustable tie or other fastener may be fed for the purpose of securing an end seal to one of the shell members. This ensures that the end seal remains attached to one of the shell members when the closure is disassembled, so that the integrity of the splice will not be compromised by movement of the end seal and/or cables. This latter feature is especially important in fiber optic splices.

The preceding description of the present invention is merely illustrative, and is not intended to be limiting. Therefore, the scope of the present invention should be construed solely by reference to the appended claims.

What is claimed is:

1. A closure system, comprising:
   first and second longitudinally-extending shell members having first and second flanges, respectively, said first and second flanges each having inner and outer surfaces such that in a closed state the inner surfaces contact one another to form at least one longitudinal seam;
   a plurality of spaced, longitudinally extending ramp pairs disposed on the outer surfaces of the flanges, wherein a first ramp of each ramp pair is disposed on the outer surface of the first flange and a second ramp of each ramp pair is disposed on the outer surface of the second flange, said plurality of ramp pairs each being inclined away from the longitudinal seam when viewed along a first direction; and
   a clamping rail having an inner surface that includes a guide channel interlocking with said plurality of ramp pairs so that the first and second flanges compress the seam.

2. The closure system of claim 1, further comprising:
   a second plurality of spaced, longitudinally extending ramp pairs disposed on the outer surfaces of the flanges; and
   a second clamping rail having an inner surface that includes a second guide channel interlocking with the second plurality of ramp pairs.

3. The closure system of claim 2, wherein the second plurality of ramp pairs are each inclined away from the longitudinal seam when viewed along a second direction that is opposite to the first direction.

4. The closure system of claim 2, further comprising a latch interlocking the first clamping rail to the second clamping rail.

5. The closure system of claim 2, wherein the first and second plurality of longitudinally extending ramp pairs are symmetrically disposed about a midpoint of the longitudinal seam.

6. The closure system of claim 1, wherein the first and second flanges form at least two longitudinal seams, further comprising:
   a second plurality of longitudinally extending ramp pairs disposed on the outer surface of the flanges at a location defining the second seam; and
   a second clamping rail having an inner surface that includes a second guide channel interlocking with the second plurality of ramp pairs.

7. The closure system of claim 6 further comprising:
   a third plurality of longitudinally extending ramp pairs disposed on the outer surface of the flanges at a location defining the second seam; and
   a third clamping rail having an inner surface that includes a third guide channel interlocking with the third plurality of ramp pairs.

8. The closure system of claim 7, further comprising:
   a fourth plurality of longitudinally extending ramp pairs disposed on the outer surface of the flanges at a second location defining the second seam; and
   a fourth clamping rail having an inner surface that includes a fourth guide channel interlocking with the fourth plurality of ramp pairs.

9. The closure system of claim 1, wherein the guide channel is recessed in the inner surface of the clamping rail.

10. The closure system of claim 9, wherein the guide channel has a shape that at least in part is a negative replica of a longitudinal profile of the plurality of ramp pairs.

11. The closure system of claim 1, wherein the guide channel includes a locking portion that radially locks the clamping rail onto at least one ramp of the plurality of ramp pairs.

12. The closure system of claim 1, further comprising means for pivotably mounting the clamping rail onto one of the shell members so that the clamping rail is free to travel a distance in the longitudinal direction at least sufficient to engage and disengage the plurality of ramp pairs.

13. The closure system of claim 1, wherein the inner surface of the clamping rail has a shape conforming to an outer surface of the shell members so that when interlocked with the plurality of ramp pairs the inner surface of the clamping rail fits against the outer surface of the shell members.

14. The closure system of claim 1, wherein the first and second shell members are semicylindrical in shape.

15. The closure system of claim 14, wherein the first and second shell members each include an outer surface on which at least one circumferentially extending rib is disposed, said ribs being integrally formed with their respective shell members.

16. The closure system of claim 15, wherein the clamping rail has an outer surface on which at least one circumferentially extending rib is disposed, said rib being integrally formed with the clamping rail.

17. The closure system of claim 16, wherein the clamping rail is formed from a plastic material.

18. The closure system of claim 15, wherein the first and second shell members are formed from a plastic material.

19. The closure system of claim 1, wherein in the closed state the first and second shell members form first and second opposing end portions each having an opening and further comprising an end seal for sealing each of the openings, said end seals being adapted to accommodate therethrough at least one cable extending through the closure.

20. The closure system of claim 1, wherein the first and second ramps of each ramp pair are symmetrically configured with respect to one another.

21. A closure system, comprising:

a sleeve having at least one seam extending in a longitudinal direction, said sleeve having first and second flanges extending on opposing sides of the seam, said first and second flanges each having inner and outer surfaces such that in a closed state the inner surfaces contact one another to seal the seam;

a plurality of spaced, longitudinally extending ramp pairs disposed on the outer surfaces of the flanges, wherein a first ramp of each ramp pair is disposed on the outer surface of the first flange and a second ramp of each ramp pair is disposed on the outer surface of the second flange, said plurality of ramp pairs each being inclined away from the seam when viewed along a first direction; and a clamping rail having an inner surface that includes a guide channel interlocking with the plurality of ramp pairs so that the first and second flanges compress the seam.

* * * * *